United States Patent
Elie-Dit-Cosaque et al.

(10) Patent No.: US 7,113,481 B2
(45) Date of Patent: Sep. 26, 2006

(54) INFORMED DYNAMIC PATH PROTECTION FOR OPTICAL NETWORKS

(75) Inventors: David Elie-Dit-Cosaque, Richardson, TX (US); Maher Ali, Richardson, TX (US)

(73) Assignee: Alcatel, Paris (FR)

( * ) Notice: Subject to any disclaimer, the term of this patent is extended or adjusted under 35 U.S.C. 154(b) by 894 days.

(21) Appl. No.: 09/998,362

(22) Filed: Nov. 29, 2001

(65) Prior Publication Data

US 2004/0246892 A1 Dec. 9, 2004

Related U.S. Application Data

(60) Provisional application No. 60/328,087, filed on Oct. 10, 2001.

(51) Int. Cl.
*H04J 1/16* (2006.01)
*H04J 3/16* (2006.01)
*H04L 1/00* (2006.01)

(52) U.S. Cl. ........................... 370/238; 370/437
(58) Field of Classification Search ................ 370/227, 370/228, 390, 432, 437, 238, 235
See application file for complete search history.

(56) References Cited

U.S. PATENT DOCUMENTS

| | | | |
|---|---|---|---|
| 6,718,141 B1 * | 4/2004 | deVette | 398/82 |
| 6,850,487 B1 * | 2/2005 | Mukherjee et al. | 370/225 |
| 6,850,705 B1 * | 2/2005 | Su et al. | 398/5 |
| 6,868,057 B1 * | 3/2005 | Sha | 370/216 |
| 2001/0021049 A1 * | 9/2001 | De Girolamo et al. | 359/124 |
| 2001/0038472 A1 * | 11/2001 | Lee et al. | 359/110 |
| 2002/0097671 A1 * | 7/2002 | Doverspike et al. | 370/216 |
| 2002/0163682 A1 * | 11/2002 | Su et al. | 359/110 |
| 2004/0218525 A1 * | 11/2004 | Elie-Dit-Cosaque et al. | 370/223 |

FOREIGN PATENT DOCUMENTS

| | | |
|---|---|---|
| EP | 0949777 A | 10/1999 |
| EP | 1096712 A | 5/2001 |

OTHER PUBLICATIONS

Sengupta and Ramamurthy, Capacity Efficient Distributed Routing of Mesh-Restored Lightpaths in Optical Networks, IEEE GLOBECOM 2001, Nov. 2001, IEEE, US.

(Continued)

*Primary Examiner*—Huy D. Vu
*Assistant Examiner*—Blanche Wong
(74) *Attorney, Agent, or Firm*—Anderson, Levine & Lintel; Jessica W. Smith; V. Lawrence Sewell

(57) ABSTRACT

Protection paths are dynamically allocated in a wavelength-division multiplexed network including a plurality of nodes (12) coupled by communication links (14). A database (26) stores information regarding the status of the network including information associating channels in each link of the node to one or more protection paths and information associating channels in each link to respective working paths. Upon receiving a request for a new protection path to protect a defined working path, links are identified that have at least one shareable channel which may be shared between the new protection path and one or more existing protection paths, as are links that do not have a shareable channel but do have an unused channel that may be used for the new protection path. Costs are assigned to identified links where links that have at least one shareable channel are weighted differently than links that do not have a shareable channel. A protection path is determined using the found links based on the costs.

17 Claims, 4 Drawing Sheets

OTHER PUBLICATIONS

Su and Su, An Online Distribute Protection Algorithm in WDM Networks, ICC 2001, Jun. 2001, IEEE, US.

Awduche D., et al, "Multiprotocol LAMBDA Switching: Combining MPLS Traffic Engineering Control with Optical Crossconnects", IEEE Commmunications Magazine, IEEE Service Center, New York NY, US, vol. 39, No., 3, Mar. 2001, pp. 111-116, XP001059336.

Baworntummarat C et al, "On the Comparison of Optical WDM Mesh Network Protection Strategies", MILCOM 2000. 21st Century Military Communications Conference Proceedings Oct. 22-25, 2000, Piscataway. NJ USA, IEEE, vol. 2, Oct. 22, 2000, pp. 886-891, XP010532032.

Sabella R et al, "Impact of Transmission Performance on Path Routing in All-Optical Transport Networks" Journal of Lightwave Technology, IEEE Service Center, New York, NY, US, vol. 16, No. 11, Nov. 1998 pp. 1965-1971, XP000831709.

* cited by examiner

| Shared Protection Table 42 | | |
|---|---|---|
| Link | Channel/(Fiber) | Working Path(s) |
| AB | 1 | {A,B,D,F} |
| AB | 2 | {A,B} |
| AB | 3 | |
| AB | 4 | {A,C,D,F} |
| AB | 5 | {A,C,E} {B,D,F} |
| AB | 6 | {Q,R,S} |
| ... | ... | ... |
| AC | 1 | {A,C} |
| AC | 2 | {A,B,D,F} |
| ... | ... | ... |

*Fig. 3a*

| Link Allocation Table 44 | | |
|---|---|---|
| Link | Channel/(Fiber) | Status |
| AB | 1 | In Use |
| AB | 2 | In Use |
| AB | 3 | Available |
| AB | 4 | Shared |
| ... | ... | ... |
| AC | 1 | Available |
| AC | 2 | Shared |
| ... | ... | ... |

*Fig. 3b*

INFORMED DYNAMIC PATH PROTECTION FOR OPTICAL NETWORKS

CROSS-REFERENCE TO RELATED APPLICATIONS

This application claims the benefit of the filing date of copending provisional application U.S. Ser. No. 60/328,087, filed Oct. 10, 2001, entitled "Informed Dynamic Path Protection for Optical Networks" to Elie-Dit-Cosaque et al.

STATEMENT OF FEDERALLY SPONSORED RESEARCH OR DEVELOPMENT

Not Applicable

BACKGROUND OF THE INVENTION

1. Technical Field

This invention relates in general to WDM networks and, more particularly, to a method and apparatus for providing shared path protection in a WDM network.

2. Description of the Related Art

The ever-increasing needs for more communication bandwidth is driving the conversion to optical networking. The use of WDM (wavelength-division multiplexing) for the transmission of many independent communication channels on a single fiber provides a significant increase in bandwidth over single wavelength networks. Managing this huge bandwidth, however, can be challenging.

In the past, connections between nodes have been performed manually. Multi-protocol lambda switching (MP$\lambda$S) now provides the structure for intelligent usage of optical resources, including capabilities for fast provisioning of wavelengths, $\lambda$-bands and even fibers.

Protection of connections remains a problem. With WDM, losing a single fiber can result in the simultaneous loss of many channels. According, a robust protection scheme is needed. On the other hand, optical resources are expensive and, therefore, must be conserved whenever possible. Ring structures, for example, provide additional protect fibers to be used in the event of a failure. The protect fibers must be located physically apart from the associated working fibers in order to prevent a single event from disrupting communications over both lines. The protect fibers, in a ring structure, are seldom used to pass traffic—a waste of a valuable resource.

Therefore, a need has arisen for a method and apparatus for efficient protection of working channels in an optical network.

BRIEF SUMMARY OF THE INVENTION

In the present invention, protection paths are dynamically allocated in a wavelength-division multiplexed network including a plurality of nodes coupled by communication links. A database stores information regarding the status of the network including information associating channels in each link of the node to one or more protection paths and information associating channels in each link to respective working paths. Upon receiving a request for a new protection path to protect a defined working path, links are identified that have at least one shareable channel which may be shared between the new protection path and one or more existing protection paths, and additional links are identified that do not have a shareable channel but do have an unused channel that may be used for the new protection path.

Costs may be assigned to identified links where links that have at least one shareable channel are weighted differently than links that do not have a shareable channel. A protection path is determined using the identified links based on the costs.

The present invention provides significant advantages over the prior art. First, allocation of protection paths is highly efficient, because cost calculations are weighted to promote sharing protection channel resources. Second, allocation of working channels is more efficient, since fewer channels are needed for protection. Third, protection paths can be accurately generated since each node has a local database of all relevant information for links throughout the network domain.

BRIEF DESCRIPTION OF THE SEVERAL VIEWS OF THE DRAWINGS

FIG. 3a illustrates a shared protection table;

FIG. 3b illustrates a link allocation table;

DETAILED DESCRIPTION OF THE INVENTION

The present invention is best understood in relation to FIGS. 1–6 of the drawings, like numerals being used for like elements of the various drawings.

Figure 1:
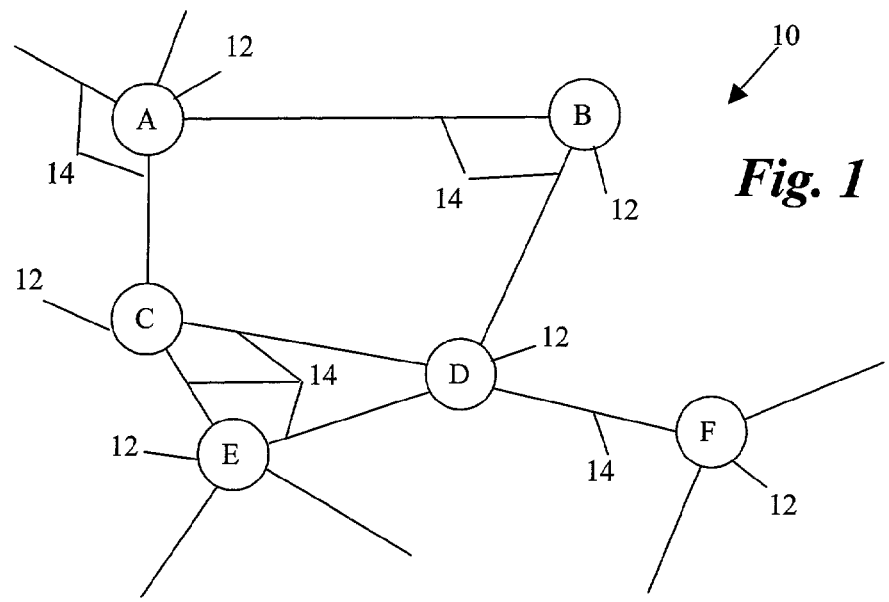
FIG. 1 illustrates a generalized block diagram of an WDM network.

For a more complete understanding of the present invention, and the advantages thereof, reference is now made to the following descriptions taken in conjunction with the accompanying drawings, in which:

FIG. 1 illustrates a block diagram of a generalized optical network 10. The network includes a plurality of nodes 12 coupled by optical links 14. A link 14 is a fiber carrying data between two nodes; for example, between node A and node B. The fiber carries information over n of wavelengths or "channels". The links 14 are unidirectional, therefore, there are typically two links between connected pairs of nodes, with each node receiving information on one link and transmitting data on the other link. For purposes of illustration, only one link is shown in FIG. 1, it being understood that at least a link in each direction would normally be used in an actual implementation. Information is transmitted over the links using WDM. In WDM, different channels of information are simultaneously modulated using respective light frequencies. The number of wavelengths, n, may differ for each fiber.

A "path" is a collection of links. A path is designated herein as a sequence of nodes between an originating node and a destination node. Hence, {A,B,D,F} designates a path between originating node A and destination node F, using links between node A and node B, node B and node D, and node D and node F. A "connection" is a data transmission event over a path and is determined by a start and duration time. The connection may use different channels over different links. For example, a connection between node A and node D may use path {A,B,D} where the information is passed from node A to node B over $\lambda_1$ (where $\lambda_1$ is a channel) and is passed from node B to node D over $\lambda_{13}$.

Figure 2:
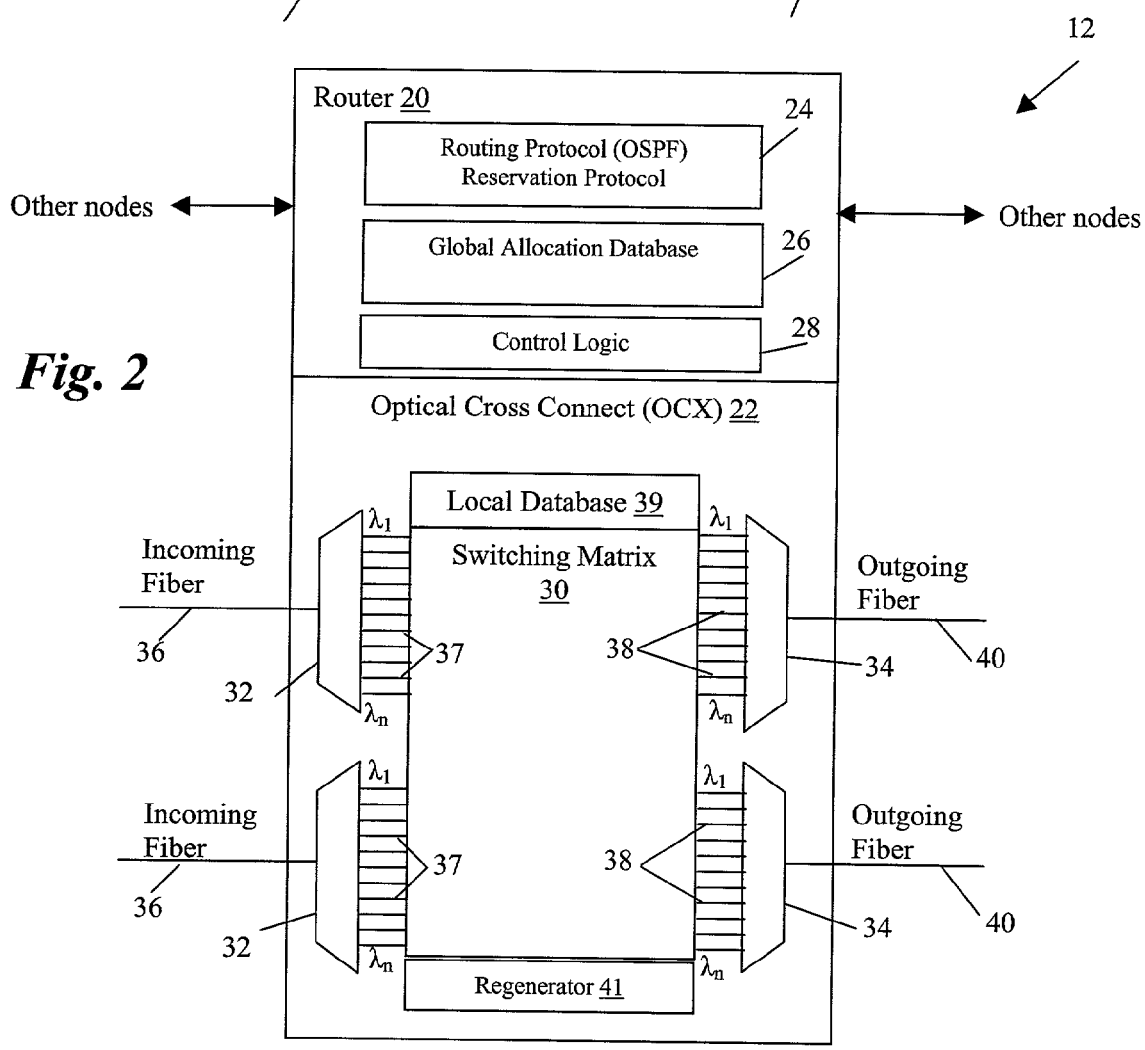
FIG. 2 illustrates a block diagram of a node of FIG. 1.

A block diagram of a node 12 is shown in FIG. 2. A node 12 comprises a router 20 and a cross connect 22. The router 20 includes routing protocol logic 24, a global database 26, and control logic 28. The optical cross connect 22 includes a switching matrix 30 coupled between one or more input demultiplexers 32 and one or more output multiplexers 34.

In operation, the router 20 is in charge of control signaling in the network 10, for example using MP$\lambda$S. The global allocation database 26 comprises one or more tables that provide a current topology of the network 10 for intelligent, dynamic creation of network paths under control of control logic 28.

The global allocation database 26 provides information regarding each channel of each link in the network domain. Each channel could be (1) used in a working path, (2) used in a protection path, but not available for sharing, (3) used in a protection path and available for sharing, or (4) not used for either working or protection.

The cross-connect 22 is responsible for passing information from a channel on an incoming fiber to a channel on an outgoing fiber. Channels of an incoming fiber 36 are demultiplexed into the constituent incoming channels 37 ($\lambda_1$ through $\lambda_n$). The switching matrix 20 passes each incoming channel to an outgoing channel 38 as defined by the local mapping table 39. The outgoing channels are multiplexed onto outgoing fibers 40. A regenerator 41 is used to couple channels with different wavelengths.

Global database 26 includes information for determining the existence of links having channels currently used for protection paths, where the channels can be shared with other protection paths, and links having channels that are currently unused by either working paths or protection paths.

The global allocation database 26 could take many forms. For purposes of illustration, FIGS. 3a and 3b show a global allocation database 26 including a global shared protection table 42 (FIG. 3a) and a global link allocation table (FIG. 3b).

As shown in FIG. 3a, the global shared protection table 42 contains entries for each channel in each link that is used for path protection. In the illustrated embodiment, each channel is identified by the link and channel number fields. If there are multiple fibers between two nodes, each channel could be identified by link, fiber, and channel number within the fiber. The working path(s) associated with the channel are set forth in the Working Path(s) field.

FIG. 3b illustrates a similar structure for the global link allocation table 44, which maintains a record of the status of all channels for all links in the domain. Again, each channel on all the links in the domain is identified by link and channel number (and, optionally, fiber number) fields. A status field identifies the channel as being "shared", "in use" or "available". "Shared" identifies channels that are currently used for a protection path and could be used for shared protection. "In use" identifies channels used for working paths. Further, "in use" could identify protection paths for which shared protection is not to be used; for example, for a high quality class of service, a working path may be protected using 1+1 protection, where sharing of the protect channels is not allowed. "Available" identifies channels that are not currently used for working or protection paths.

In operation, every node 12 maintains the entries in the global allocation database 26 for its own links. Information for other links in the global allocation database are compiled from information of the global allocation databases from other nodes 12 in the domain. The information from the global allocation databases 26 of the various nodes is flooded to all nodes in the domain using a variant of the OSPF (Open Shortest Path First) protocol upgraded for optics. In order to reduce the amount of information passed between the nodes, only the changed information is passed via OSPF.

Protection messages for updating the global allocation database 26 are received by the nodes 12 using LDP (Label Distribution Protocol) messages. The protection messages may be the same as those used for reservation of a working path, with the addition of two fields: (1) a Type field that indicates whether the connection is for a protection path (Type field set to "1") or a working path (Type field set to "0") and (2) a Working Path field that identifies the working path that needs the protection. The protection message may be either a SETUP or RELEASE message.

When a node 12 receives a protection message (with the TYPE field set to 1), two outcomes can happen. If the message is SETUP, then the channel-to-use field is read from the LDP packet. If the channel-to-use is already reserved by another protection path in the shared protection table 42, the working path is added to the list of working paths in the Path field for that channel. If the channel-to-use is not currently reserved for a protection path, then the channel is reserved in the link allocation table 44 and the working path is added to the list of protected paths in the shared protection table 42.

If the message is RELEASE, the channel-to-release field is read from the LDP packet. If multiple protection paths in the shared protection table 42 already share this channel, then the working path from the Working Path field of the LDP packet is removed from the Path field. If the working path is the only protected path by this channel, then the working path is removed from the shared protection table 42 and the resources for this channel are released in the link allocation table 44.

Figure 4:
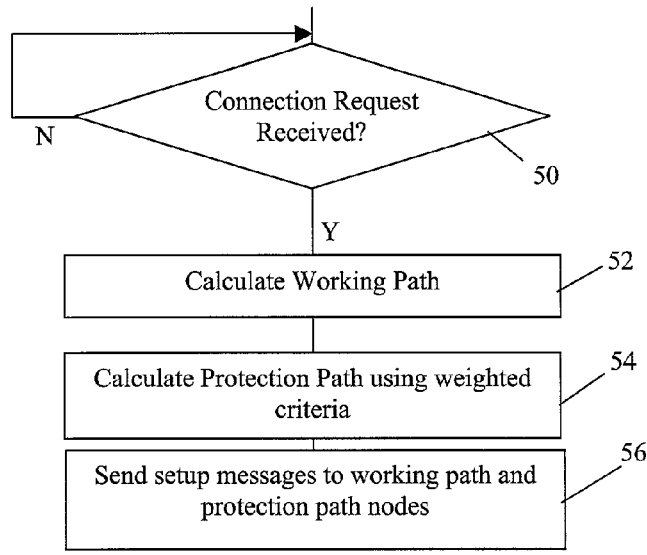
FIG. 4 illustrates flow diagram of generating a connection.

In the preferred embodiment, the protection path selection is performed at the source node, as is the working path selection. FIG. 4 illustrates a flow diagram for working and protection path selection. After a connection request is received in decision block 50, a working path is calculated in block 52. After the working path is calculated, a protection path is calculated using weighted criteria in block 54. If both the protection path and the working path calculations are successful, setup messages are sent to the working path and protection path nodes in block 56. In the preferred embodiment, two setup packets are prepared and sent along the constrained working path and protection path respectively. The setup packet for said protection path includes the associated working path, such that the shared protection tables 42 of the affected nodes may be updated and flooded to the other nodes in the domain.

The working path may be calculated using a number of various well-known techniques. A preferred embodiment for a connection session $\psi_i$ is shown below in pseudo-code, where $\psi_i=(s_i, d_i, B_i)$, and $s_i$ is the source IP router, $d_i$ is the destination IP router, and $B_i$ is the bit rate of the connection:

Procedure PrepareSetupMessage($\psi_i$)
BEGIN
Let Network be a subgraph of the original topology where an edge exists between two nodes if at least one wavelength is free on the fiber link between them.
Remove from Network all edges which cannot handle bit-rate of Session $\psi_i$ without regeneration.
IF $s_i$ and $d_i$ are disconnected in Network THEN "Connection is blocked"
RETURN
END IF
Let Path equal to the shortest path (in terms of PMD accumulation) from $s_i$ to $d_i$ in Network
Use the First-Fit algorithm to assign wavelength.
Install regenerators if required.
Partition the path into segments where each segment has the maximum length without need for regeneration.
Install regenerators between segments.
Let c_message be a control packet where the three vectors: constrained path, wavelength assignment, and regenerator request have been filled.
RETURN c_message
END Given the current status of fiber links collected via the link-state protocol, the source node computes locally a path which traverses fiber links such that both the logical aspects (such as wavelength continuity constraint) and physical aspects, e.g., PMD (Polarization Mode Dispersion) factor, are not violated. It starts by creating a sub-graph consisting of all the links in the domain having at least one channel available. After that, depending on the bit-rate of the connection, some links might not be able to handle the connection's bit-rate and these are also removed. A test is then made to check if the source and destination are in the same connected component. If they are disconnected, the call is rejected. Otherwise, Dijkstra's shortest path algorithm is run to find the shortest path with regard of the total PMD accumulation.

Next, the wavelength assignment process is executed, preferably utilizing a variation of the First-Fit wavelength assignment scheme which runs as follows. The first available wavelength on the first fiber link is picked. Next, a wavelength is chosen from the next immediate fiber link with preference to the same wavelength as in the preceding link. If the wavelength is not available, the first wavelength available is picked and a regenerator (acting as an opaque wavelength converter at the connecting cross connect) is installed. This process is repeated for all links in that order.

After taking care of the logical aspects of the routing and channel assignment problem, the physical aspects are handled as follows. The path is partitioned into the smallest number of transparent segments. These segments are then interconnected via regenerators.

Figure 5:
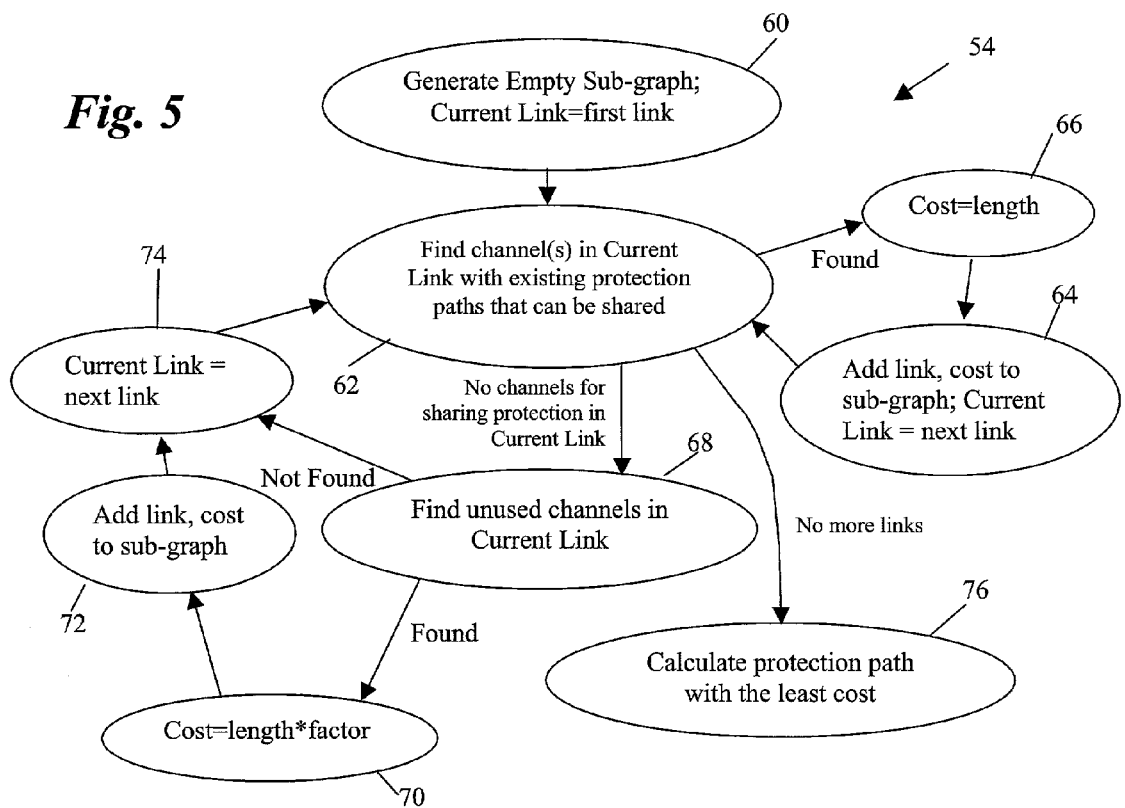
FIG. 5 illustrates a state diagram describing the calculation of a protection path.

FIG. 5 illustrates a state diagram showing the operation of the calculation of the protection path step 54. In state 60, an empty sub-graph is generated. This sub-graph will be filled with links that can potentially be used for a protection path. Once, the sub-graph is generated, the control logic 28 in the source node attempts to find whether a Current Link (initially set to the first link in the shared protection database 42) has channels that are currently being used for a protection path and can be shared with the protection path being calculated, in state 62. A channel can be used in the protection path if and only if: (1) its link is not used by the working path and (2) the working path(s) already protected by the channel do not have common links with the new working path trying to share the channel. In other words, if the channel is in a link used by the working path, it cannot be used for the protection path, because failure of the link would result in failure of both working and protection paths. Similarly, if the working path(s) currently protected by the channel have a common link with current working path, the channel cannot be used because failure of the common link would result in both working path requiring the common link for restoration. A link that satisfies the two conditions is said to be "edge disjoint."

If a suitable channel in the Current Link is found in state 62, the cost associated with the link is calculated as equal to the length of the link in state 64. Then, in state 66, the link is added to the sub-graph and the Current Link is incremented to the next link in the database.

If the Current Link does not have suitable channels for shared protection in state 62, the Current Link is examined for unused channels (i.e., channels not used for any working or protection path) in state 68. If a suitable unused channel is found, its cost is calculated in state 70. Unlike the cost calculation in state 64, the cost calculation for using a previously unused channel is equal to the length of the link multiplied by a factor greater than one. Accordingly, shared protection paths are favored in the cost calculation. The link and its cost are added to the sub-graph in step 72. The Current Link is then incremented in state 73 and the next link is examined for available shared protection channels in state 62.

If the Current Link has no available shared protection channels in state 62 and no unused channels in state 68, the Current Link is incremented in state 74, without adding the link to the sub-graph. The next link is then examined for available shared protection channels in state 62.

Once there are no more links to be examined in state 62, the protection path with the least cost is calculated using any of a number of well-known methods, such as Dijkstra's method, in state 76.

In operation, the degree of sharing can be controlled by controlling the penalty factor in state 70. By assigning a higher factor, more shared paths will be used for protection paths. By assigning a lower factor, shorter protection paths will be encouraged. Accordingly, as channels become more scarce, the penalty factor can be increased to lower the number of channels used for protection.

Pseudo-code for implementing the state diagram of FIG. 5 for the database structure set forth above is provided below:

Prepare the constrained Shared protection path
Let the working path be a vector of node numbers and representing the working light path previously calculated.
Let SP database be the Global Shared Protection table 42 of the node
Let Link Allocation Database be the Global Link Allocation table 44 of the node
Let sub graph be an empty network topology database
Let Penalty coefficient be a number
Create sub-graph with nodes and arcs having those properties:
For each link in the SP database do
Let Current_link_SP be the link extracted from the SP database
If the link is not used by the working path then
    If the working path has no common link with the working paths protected by this wavelength) then
        add the link
        set the cost equal to the length of the link
    endif
else
find Current_link_SP in the Link Allocation Database
Let Current_link_allocation be this link.
if a wavelength is available in Current_link_allocation then
    add the link set the cost of the link equal to the length of the link
multiply the cost by the penalty coefficient
endif
Next for each link
End create subgraph
Let Protection Path be the shortest path to destination for the triplet <source, destination, sub graph>
Return Protection Path
End Prepare the constrained Shared protection path Once all the links in the protection path are determined, the source router selects the channels within the links. For each link in the protection path, the channels are selected as follows:

If multiple shared wavelengths exist on the link, the one shared the least number of times is chosen;

If no shared wavelength exists on the link, a first-fit algorithm (described above) is applied.

The process for selecting channels is repeated for all of the links in the protection path. If the channel allocated for the previous link along the path is different from the current one, converter is installed. The link allocation is stored before transmission in a vector of pairs (node, wavelength). Similarly, the converter allocation is stored in a vector of pairs (node, regeneration (yes/no)).

Figure 6:
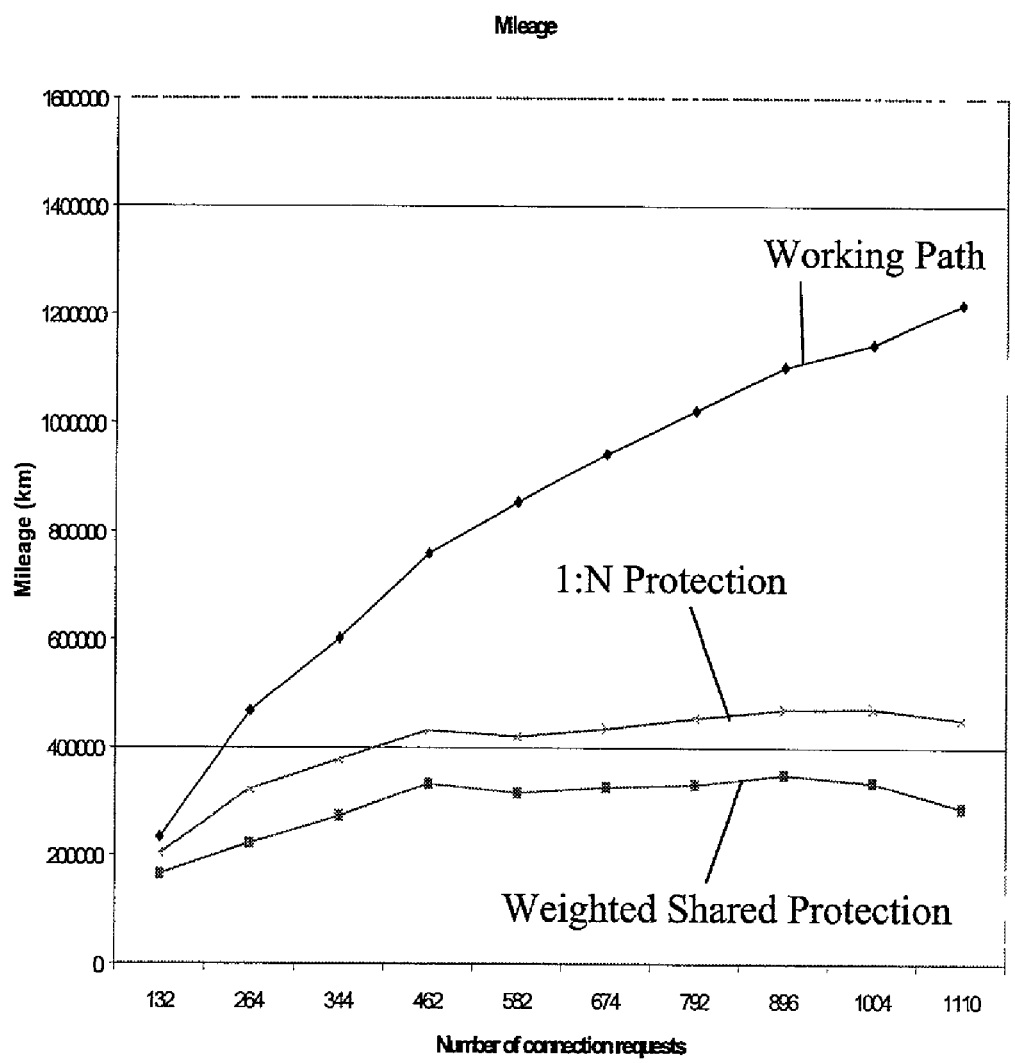
FIG. 6 illustrates a graph showing the efficiency of a weighted shared protection path calculation method.

The efficiency of the present invention of calculating a protection path using weighted link cost is shown in FIG. 6. FIG. 6 illustrates the efficiency in term of wavelength mileage of the weighted shared protection scheme described above and a typical 1:N protection scheme. Under low traffic conditions, both the weighted shared protection and 1:N protection schemes satisfy all the connection requests. The weighted shared protection provides the same level of protection as the 1:N protection, but the total mileage used for protection is up to 45% less. Since weighted shared protection is more efficient in channel usage than 1:N protection, the generation of working paths will be more efficient as well.

When the load increases, the weighted shared protection performs better than the 1:N protection, but the gain in term of wavelength mileage tends to decrease by about 10%.

If the network is overloaded, the weighted shared protection performs 50% better than 1:N Protection. When the load increases, the multiplexing becomes high. As a result, the blocking probability increases to more than 50%. Both protocols give close results when looking at the blocking. 1:N Protection case shows 2% more blocking than the weighted shared protection case.

It should be noted that many variations could be made from the illustrated embodiment. First, the structure of the database could be significantly different. For example, the database 26 could be formed of separate tables for each link in the domain, rather than a single table with multiple links. Second, many different protocols, currently available or developed in the future could be used to communicate path information between the nodes 12.

Weighting could be accomplished using many different schemes other than that shown. For example, the cost of using a shared protection channel could be multiplied by a factor less than one, rather than multiplying an available channel by a factor greater than one. Multiple weights could also be use based on various criteria. For example, the weight for using an available channel on a link with five or less available channels could be greater than the weight for a link with six or more available channels. Weighting could be applied to other resources, such as the use of regeneration in implementing the protection path.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of dynamically allocating protection paths in a wavelength-division multiplexed network including a plurality of nodes coupled by communication links, comprising the steps of:

in each node, maintaining a database of information regarding the status of the network including information associating channels in each link of the node to one or more protection paths and information associating channels in each link to respective working paths;

in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel; and determining a protection path using said identified links based on said costs, such that links not having at least one shareable channel are disfavored relative to links having at least one shareable channel.

2. The method of claim 1 wherein said cost of a link having at least one shareable channel is based on the length of the link.

3. The method of claim 2 wherein said cost of a link not having at least one shareable channel is based on a multiple of length of the link, such that links not having at least one shareable channel are disfavored relative to links having at least one shareable channel.

4. A method of dynamically allocating protection paths in a wavelength-division multiplexed network including a plurality of nodes coupled by communication links, comprising the steps of:

in each node, maintaining a database of information regarding the status of the network including information associating specific channels in each link of the node to one or more protection paths, information associating channels in each link to respective working paths, and information on the availability of specific channels to be used for a protection path;

in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel;

determining a protection path using said identified links based on said costs, such that links not having at least one shareable channel are disfavored relative to links having at least one shareable channel; and transmitting a setup message to each node on the protection path, wherein the setup message includes a working path identifier.

5. A method of dynamically allocating protection paths in a wavelength-division multiplexed network including a plurality of nodes coupled by communication links, comprising the steps of:

in each node, maintaining a database of information regarding the status of the network including information associating specific channels in each link of the node to one or more protection paths, information associating channels in each link to respective working paths, and information on the availability of specific channels to be used for a protection path;

in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel; and determining a protection path using said identified links based on said costs, such that links not having at least one shareable channel are disfavored relative to links having at least one shareable channel, wherein said request is received by a source node.

6. A method of dynamically allocating protection paths in a wavelength-division multiplexed network including a plurality of nodes coupled by communication links, comprising the steps of:

in each node, maintaining a database of information regarding the status of the network including information associating specific channels in each link of the node to one or more protection paths, information associating channels in each link to respective working paths, and information on the availability of specific channels to be used for a protection path;

in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel; and determining a protection path using said identified links based on said costs, such that links not having at least one shareable channel are disfavored relative to links having at least one shareable channel, wherein said database identifies a status for each channel of each link.

7. The method of claim 6 wherein said database identifies each channel of each link as being either in use, available or shared.

8. A method of dynamically allocating protection paths in a wavelength-division multiplexed network including a plurality of nodes coupled by communication links, comprising the steps of:

in each node, maintaining a database of information regarding the status of the network including information associating specific channels in each link of the node to one or more protection paths, information associating channels in each link to respective working paths, and information on the availability of specific channels to be used for a protection path;

in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel; and determining a protection path using said identified links based on said costs, such that links not having at least one shareable channel are disfavored relative to links having at least one shareable channel, wherein said step of using the database of said one node to identify links that have at least one shareable channel includes the step of identifying links that are not used by the defined working path.

9. The method of claim 8 wherein said step of using the database of said one node to identify links that have at least one shareable channel further includes the step of identifying links having a channel not used to protect any working paths having common links with the defined working path.

10. A wavelength-division multiplexed network comprising:

a plurality of nodes coupled by communication links, each node comprising router circuitry for:

maintaining a database of information regarding the status of the network, including information associating specific channels in each link of the node to one or more protection paths, information associating channels in each link to respective working paths, and information on the availability of specific channels to be used for a protection path; and in response to receiving a request for a new protection path to protect a defined working path in one of said nodes:

using the database of said one node to identify links that have at least one shareable channel which may be shared between the new protection path and one or more existing protection paths;

using the database of said one node to identify links that do not have a shareable channel but do have an unused channel that may be used for said new protection path;

assigning weighted costs to said identified links, where links that have at least one shareable channel are assigned a lower cost than links that do not have a shareable channel but do have an unused channel; and determining a protection path using said identified links based on said costs, such that links not having at least one shareable channel are disfavored relative to links having at least one shareable channel, wherein said router circuitry identifies links that are not used by the defined working path.

11. The network of claim 10, wherein said cost of a link having at least one shareable channel is based on the length of the link.

12. The network of claim 11 wherein said cost of a link not having at least one shareable channel is based on a multiple of length of the link, such that links not having at least one shareable channel are disfavored relative to links having at least one shareable channel.

13. The network of claim 10 wherein said router circuitry transmits a setup message to each node on the protection path, wherein the setup message includes a working path identifier.

14. The network of claim 10 wherein said database identifies a status for each channel of each link.

15. The network of claim 14 wherein said database identifies each channel of each link as being either in use, available or shared.

16. The network of claim 10 wherein said router circuitry identifies links having a channel not used to protect any working paths having common links with the defined working path.

17. The network of claim 10 wherein each node further comprises a switching matrix.

* * * * *